(12) United States Patent
Chang et al.

(10) Patent No.: US 7,754,385 B2
(45) Date of Patent: Jul. 13, 2010

(54) ANODE ACTIVE MATERIAL WITH IMPROVED ELECTROCHEMICAL PROPERTIES AND ELECTROCHEMICAL DEVICE COMPRISING THE SAME

(75) Inventors: Sung Kyun Chang, Daejeon (KR); Hyeong Jin Kim, Seoul (KR); Sang Hoon Choy, Daejeon (KR); Jeong Ju Cho, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 12/535,207

(22) Filed: Aug. 4, 2009

(65) Prior Publication Data

US 2009/0289219 A1 Nov. 26, 2009

Related U.S. Application Data

(62) Division of application No. 11/112,170, filed on Apr. 22, 2005, now Pat. No. 7,629,082.

(30) Foreign Application Priority Data

Apr. 23, 2004 (KR) .................. 10-2004-0028184

(51) Int. Cl.
*H01M 4/58* (2010.01)
(52) U.S. Cl. .................. 429/231.8; 429/221; 429/223; 429/224; 429/231.5; 429/231.6; 429/218.1; 429/229; 427/58; 427/123; 427/126.1; 252/182.1
(58) Field of Classification Search .............. 429/231.8, 429/221, 223, 224, 229, 231.5, 231.6, 218.1; 427/58, 123, 126.1; 252/182.1
See application file for complete search history.

(56) References Cited

U.S. PATENT DOCUMENTS 5,474,861 A 12/1995 Bito et al.

FOREIGN PATENT DOCUMENTS

| CN | 1472831 | 2/2004 |
|----|---------|--------|
| DE | 19735803 | 2/1999 |
| JP | 61-096095 | 5/1986 |
| JP | 61-292859 | 12/1986 |
| JP | 62-154626 | 7/1987 |

(Continued)

OTHER PUBLICATIONS

Chinese Office Action Dated May 8, 2009 corresponding to Chinese Patent Application No. 200580012664.9.

*Primary Examiner*—Laura S Weiner
(74) *Attorney, Agent, or Firm*—Cantor Colburn LLP

(57) ABSTRACT

Disclosed is an anode active material, comprising: (a) a carbonaceous material; and (b) a carbide coating layer partially or totally formed on a surface of the carbonaceous material, the carbide coating layer comprising at least one element selected from the group consisting of metals and metalloids. An anode obtained by using the anode active material and an electrochemical device comprising the anode are also disclosed. The carbonaceous material comprises a coating layer of metal-/metalloid-carbide obtained by treating it at high temperature under inert atmosphere, wherein the coating layer has increased interfacial boding force to the carbonaceous material and thus shows minimized reactivity to lithium. The carbonaceous material as anode active material can minimize the irreversible anode capacity needed for the formation of an SEI film during the first charge/discharge cycle, thereby providing high capacity, high efficiency and significantly improved anode qualities.

10 Claims, 3 Drawing Sheets

FOREIGN PATENT DOCUMENTS

| | | |
|---|---|---|
| JP | 62-290067 | 12/1987 |
| JP | 64-52690 | 2/1989 |
| JP | 05-299073 | 12/1993 |
| JP | 08-203523 A | 8/1996 |
| JP | 11-214004 | 8/1999 |
| JP | 11-329435 A | 11/1999 |
| JP | 2000-188134 A | 7/2000 |
| JP | 3103357 A | 8/2000 |
| JP | 2001-102047 A | 4/2001 |
| JP | 2002-352801 A | 12/2002 |
| JP | 2003-249219 A | 9/2003 |
| KR | 10-2001-0087559 | 9/2001 |
| WO | 03/073539 | 9/2003 |

ANODE ACTIVE MATERIAL WITH IMPROVED ELECTROCHEMICAL PROPERTIES AND ELECTROCHEMICAL DEVICE COMPRISING THE SAME

CROSS REFERENCE OF APPLICATION

This application is a divisional application of U.S. patent application Ser. No. 11/112,170, filed Apr. 22, 2005 which is now U.S. Pat. No. 7,629,082, which claims priority to and the benefit of Korean Patent Application No. 10-2004-0028184 filed on Apr. 23, 2004 in the Korean Patent Office, the entire contents of which are incorporated hereinto by reference.

TECHNICAL FIELD

The present invention relates to a carbonaceous material comprising a coating layer of metal-/metalloid-carbide. More particularly, the present invention relates to an anode active material comprising a carbonaceous material having improved electrochemical properties by treating it at high temperature under inert conditions, a method for preparing the same, an anode obtained by using the same and an electrochemical device comprising the same anode.

BACKGROUND ART

Recently, as electronic equipments are downsized and lightened and use of portable electronic instruments is generalized, research and development into lithium secondary batteries have been made intensively. Lithium secondary batteries are generally obtained by using materials capable of lithium ion intercalation/deintercalation as anode and cathode and filling an organic electrolyte or polymer electrolyte into the gap between the cathode and anode. Such lithium secondary batteries generate electric energy by redox reactions when lithium ion intercalates or deintercalates at the cathode and anode.

Because a lithium secondary battery serves to transfer energy while lithium ions reciprocate between a cathode and anode like a rocking chair, it is also referred to as a "rocking chair battery". During the first charge cycle, an anode active material such as the surface of carbon particles is reacted with an electrolyte to form a solid electrolyte interface (SEI) film at an anode. The SEI film serves to inhibit decomposition of the electrolyte on the surface of anode active material and thus to stabilize a battery. However, because a certain amount of lithium is consumed in order to form the SEI film, amount of reversible lithium decreases, followed by degradation in the battery capacity. Particularly, when irreversible capacity of an anode is large in a currently used secondary battery system whose lithium source is present at a cathode, irreversibility of the anode results in a dead volume of the cathode. Therefore, in practice, the cathode provides a capacity lower than the actual capacity applicable to the cathode, resulting in degradation in the battery capacity.

BRIEF DESCRIPTION OF THE DRAWINGS

The foregoing and other objects, features and advantages of the present invention will become more apparent from the following detailed description when taken in conjunction with the accompanying drawings in which.

DISCLOSURE OF THE INVENTION

Figure 1:
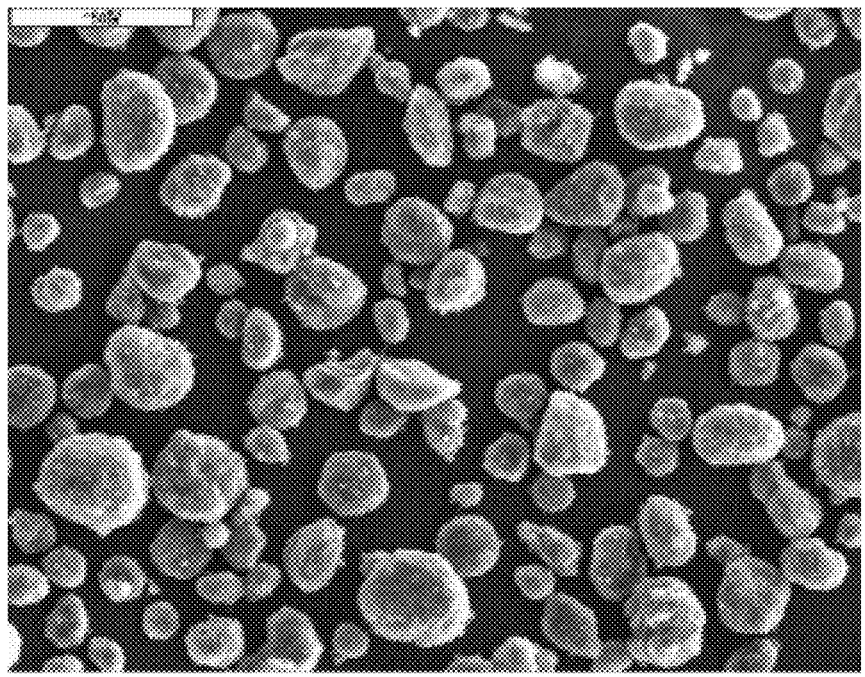
FIG. 1 is an SEM (Scanning Electron Microscope) picture of a non-treated carbonaceous material.

Therefore, the present invention has been made in view of the above-mentioned problems. We have found that when a carbonaceous material coated with a metal and/or metalloid compound by a conventional coating process is surface-treated under high-temperature/inert atmosphere, a stable carbide coating layer having minimized reactivity to lithium is formed on the surface of the carbonaceous material, thereby minimizing the initial irreversible capacity of an anode.

Therefore, it is an object of the present invention to provide an anode active material with improved electrochemical properties as described above and a method for preparing the same.

It is another object of the present invention to provide an electrochemical device comprising an anode obtained by using the above anode active material.

According to an aspect of the present invention, there is provided an anode active material, which comprises: (a) a carbonaceous material; and (b) a carbide coating layer partially or totally formed on the surface of the carbonaceous material, the carbide coating layer comprising at least one element selected from the group consisting of metals and metalloids. An anode obtained by using the anode active material and an electrochemical device comprising the anode are also provided.

According to another aspect of the present invention, there is also provided a method for preparing a carbonaceous material having a coating layer of metal-/metalloid-carbide, which comprises the steps of: (a) coating the surface of a carbonaceous material with a compound comprising at least one element selected from the group consisting of metals and metalloids; and (b) heat-treating the carbonaceous material coated in step (a) under inert atmosphere at a temperature equal to or higher than a temperature where the metal-/metalloid-carbide is formed.

The anode active material for batteries according to the present invention is characterized by comprising at least one layer of metal- and/or metalloid-carbide.

The anode active material is prepared by coating a carbonaceous material with a metal-/metalloid-containing compound by a conventional coating process, and then heat-treating the coated carbonaceous material under inert atmosphere at a high temperature equal to or higher than a temperature where the metal-/metalloid-carbide is formed (for example, at a temperature of between 500° C. and 2000° C.), the temperature being determined by the particular metal or metalloid used as main element of the coating layer. Thus, the metal- or metalloid-carbide coating layer formed as described above shows stable physical properties with little electrochemical reactivity to lithium intercalated/deintercalated into/from the electrode active material during charge/discharge cycles of a battery.

The anode active material according to the present invention can provide a battery with high capacity as well as high efficiency by virtue of the above-described characteristics. Such preferred effects of the present invention will be explained in detail hereinafter.

(1) In general, when a carbonaceous material is used as anode active material in a lithium secondary battery, there are problems in that side reaction of the anode active material with an electrolyte results in low charge capacity and that irreversible capacity is generated during the first charge/discharge cycle, followed by degradation in cycle life characteristics. However, according to the present invention, it is possible to minimize the initial irreversible capacity of an anode by forming a coating layer of a stable compound obtained from an inorganic substance with carbon (for example, a stable metal-/metalloid-carbon coating layer having minimized reactivity to lithium), on the surface of carbonaceous material. In other words, it is possible to realize high capacity and high efficiency of a battery by minimizing the amount of reversible lithium needed for the formation of an SEI film on the surface of anode. In practice, after observing the charge/discharge efficiency of a battery using, as anode active material, the carbonaceous material coated with the metal-carbide coating layer according to the present invention, it can be seen that the anode active material according to the present invention provides an increase in charge/discharge efficiency by about 3% to 10% or more (see, FIG. 5).

(2) Additionally, because the carbonaceous material surface-treated with metal-/metalloid-carbide has a polarity higher than that of a conventional carbonaceous material, it is possible to provide excellent wetting effect when using an carbonate-based electrolyte formed of a polar solvent. Therefore, lithium ions can pass rapidly through the electrolyte, thereby improving rate characteristics of a battery.

The coating layer partially or totally formed on the surface of a carbonaceous material according to the present invention comprises carbides of general metals (for example, alkali metals, alkaline earth metals, transition metals, etc.) and/or metalloids (for example, elements of Group 13, Group 14, etc.). Preferably, the carbide is represented by the following formula 1:

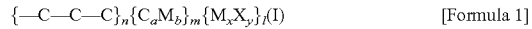
[Formula 1]

wherein M is at least one metal or metalloid element selected from the group consisting of alkali metals, alkaline earth metals, transition metals and elements of Group 13 and Group 14;

X is an oxygen atom or nitrogen atom;

each of n, m, x, a and b independently represents a natural number of 1 or more; and each of l and y independently represents an integer of 0 or more.

Preferably, the metal forming the carbide coating layer is cobalt (Co), nickel (Ni), iron (Fe), manganese (Mn), aluminum (Al), magnesium (Mg), titanium (Ti), zinc (Zn), zirconium (Zr), or the like. The metalloid is preferably, boron (B), silicon (Si) or the like.

There is no particular limitation in thickness of the metal-/metalloid-carbide coating layer formed on a carbonaceous material and the thickness can be controlled in such a range as to permit an increase in capacity and efficiency of a battery. Additionally, the coating layer may be formed in the shape of a multilayer film, wherein at least one layer preferably comprises the metal-/metalloid-carbide as described above.

A substrate to be coated with the metal-/metalloid-carbide according to the present invention may be currently used carbonaceous materials known to one skilled in the art. Non-limiting examples of the carbonaceous materials include natural graphite, artificial graphite, fiber graphite, amorphous carbon or amorphous carbon-coated graphite. Additionally, other carbonaceous materials that may be used include carbonaceous materials composed of carbon atoms only and heat-treated at a temperature of 2000° C. or higher so as to provide a completely ordered structure, such as Kish graphite (KG), SFG series (SFG-6, SFG-15, etc.), highly oriented pyrolytic graphite, MPCF (mesophase pitch based carbon fiber), MCMB series (MCMB 2800, MCMB 2700, MCMB 2500, etc.) or the like.

The carbonaceous material comprising a metal-/metalloid-carbide coating layer is formed by heat treating a carbonaceous material under inert atmosphere at a temperature equal to or higher than the temperature where the metal-/metalloid-carbide is formed. There is no particular limitation in temperature for forming the metal-/metalloid-carbide, because the temperature varies with physical properties of each element. In general, the heat treatment temperature is 500° C. or higher, preferably ranges from 500° C. to 2000° C. and more preferably ranges from 800° C. to 2000° C. If the heat treatment temperature is lower than 500° C., it is not possible to obtain a significant improvement in terms of anode efficiency. If the heat treatment temperature is higher than 2000° C., there is a possibility of dissolution of metal-/metalloid carbide, resulting in phase separation from the carbonaceous material.

Additionally, as the inert atmosphere, low reactive gas known to one skilled in the art may be used. Particularly, such gas includes at least one inert gas selected from the group consisting of nitrogen, argon, helium and xenon. Such inert gas may be used in the form of a mixture with hydrogen gas in order to facilitate reduction reaction. Such inert gas suitably has a purity of between 50 and 99.999%.

There is no particular limitation in methods for manufacturing the carbonaceous material comprising a metal-/metalloid-carbide coating layer. In one embodiment, the surface of a carbonaceous material is coated with a compound comprising at least one element selected from the group consisting of metals and metalloids and then the coated carbonaceous material is heat-treated under inert atmosphere at a temperature equal to or higher than the temperature where the corresponding metal-/metalloid-carbide is formed (for example, at a temperature of between 500° C. and 2000° C.).

More particularly, the method used for coating the surface of a carbonaceous material with a metal-/metalloid-containing compound may be any method known to one skilled in the art. Non-limiting examples of the methods include general coating methods such as solvent evaporation method, co-precipitation method, precipitation method, sol-gel method, adsorption and filtering method, sputtering method, CVD (chemical vapor deposition) method, etc. There is no particular limitation in selection of the coating method.

According to one embodiment of the method for manufacturing the coated carbonaceous material, the step for coating the surface of a carbonaceous material with a metal-/metalloid-containing compound includes the steps of: (i) dispersing or dissolving a metal and/or metalloid compound comprising at least one element selected from the group consisting of cobalt (Co), nickel (Ni), iron (Fe), aluminum (Al), magnesium (Mg), boron (B), titanium (Ti), zirconium (Zr) and silicon (Si) into a solvent to provide a dispersion or solution containing the same compound; and (ii) adding the dispersion or solution obtained from step (i) to a carbonaceous material, stirring the resultant mixture and drying the mixture.

In the above coating step, the metal/metalloid compound that may be used includes a water soluble or water insoluble compound comprising cobalt (Co), manganese (Mn), nickel (Ni), iron (Fe), aluminum (Al), magnesium (Mg), boron (B), titanium (Ti), zirconium (Zr) or silicon (Si), or two or more of said elements. Particularly, it is preferable to use alkoxide, nitrate, acetate, etc., comprising at least one of said elements.

After providing a metal/metalloid compound, the metal, metalloid compound is dissolved in a solvent such as water or alcohols and then the resultant solution is added to a carbonaceous material, followed by stirring and drying.

When the solution or dispersion in which the metal and/or metalloid is dissolved is added to a carbonaceous material, the solution or dispersion is added in such an amount that the weight ratio of metal (M) to carbonaceous material (C), i.e., M/C (or S/C, in the case of metalloids (S)) ranges from 0.5 to 20 wt %, more preferably from 0.5 to 10 wt %. If the ratio is greater than 20 wt %, the proportion of the metal/metalloid oxide or carbide having a relatively low conductivity compared to carbon increases, resulting in an increase in resistance at an anode followed by degradation in battery quality. Additionally, the coated carbonaceous material may be dried by using a method currently used in the art.

The carbonaceous material dried as described above has a metal-/metalloid-oxide coating layer on its surface. During the following heat treatment step carried out under inert atmosphere, the metal-/metalloid-oxide coating layer is converted into a metal-/metalloid-carbide coating layer having reinforced interfacial bonding force with the carbonaceous material, from the top surface. The temperature where the carbide is formed depends on characteristics of each metal/metalloid, as described particularly in the following alloy phase diagram.

The process of converting a metal-/metalloid-oxide into a metal-/metalloid-carbide results from a chemical reaction specific to each metal and can be seen from the phase diagram of each metal element. For example, Co maintains its oxide state at a temperature of up to 400° C. under reductive atmosphere because cobalt oxide is not decomposed or broken at the same temperature. However, at an elevated temperature of 400° C. or higher, Co is reduced by the reaction of the surrounding carbon, thereby forming a metal-carbide composite maintaining the form of Co-carbide. Additionally, Si maintains a metal oxide state at a temperature of up to about 1400° C. under reductive atmosphere in the presence of carbon. However, at an elevated temperature of 1400° C. or higher, Si is bonded with carbon and thus maintains a metal (metalloid)-carbide form. Because such metal (metalloid)-carbides generated by heat treatment are electrochemically inactive to Li, they can minimize the irreversible amount of lithium needed for the formation of an SEI film during the first charge cycle and thus can realize high capacity and high efficiency of a battery.

In addition to the above-described method, the carbide coating layer according to the present invention can be formed by bonding a metal-/metalloid-carbide directly onto the surface of a carbonaceous material through a sputtering or CVD (chemical vapor deposition) process.

As described above, the present invention also provides an electrochemical device comprising: (a) a cathode; (b) an anode using an anode active material having the above-mentioned metal-/metalloid-carbide coating layer; (c) a separator; and (d) a non-aqueous electrolyte.

The electrochemical device includes all devices carrying out electrochemical reactions and particular examples thereof include all kinds of primary and secondary batteries, etc. Preferably, the electrochemical devices are lithium secondary batteries, which include lithium metal secondary batteries, lithium ion secondary batteries, lithium polymer secondary batteries or lithium ion polymer secondary batteries.

In order to manufacture the electrochemical device according to the present invention, any conventional method known to one skilled in the art may be used. In one embodiment of the method, the separator is interposed between two electrodes to form an assembly into which the nonaqueous electrolyte is then injected.

In this case, the cathode and anode according to the present invention may be prepared according to any conventional method known in the art. More particularly, slurry for each electrode, i.e., each of slurry containing a cathode active material and slurry containing an anode active material is formed, the formed slurry is applied on each current collector, and the solvent or dispersant contained in the slurry is removed by drying, etc., to cause the active material particles to be bound to the collector as well as among themselves. If desired, a small amount of conductive agent and/or binder may be added to the slurry.

The anode active material is the carbonaceous material comprising a metal-/metalloid-carbide coating layer according to the present invention. The cathode active material includes conventional cathode active materials that can be used in conventional electrochemical devices. Particular examples of the cathode active material include, but are not limited to, lithium intercalation materials such as lithium manganese oxides, lithium cobalt oxides, lithium nickel oxides, lithium iron oxides or composite oxides formed by combination of them (for example, $LiCoO_2$, $LiNiO_2$, $LiClO_4$, $LiCF_3SO_3$, $LiPF_6$, $LiBF_4$, $LiAsF_6$, $LiN(CF_3SO_2)_2$ or $LiMn_2O_4$).

The conductive agent may be any electroconductive material that does not undergo a chemical change in a finished battery. Particular examples of the conductive agent that may be used include carbon black such as acetylene black, ketjen black, furnace black, thermal black, etc.; natural graphite, artificial graphite, conductive carbon fiber, or the like. It is preferable to use carbon black, graphite powder and carbon fiber.

The binder that may be used includes any one of thermoplastic resins and thermosetting resins, or any combination thereof. Among those, preferred is polyvinylidene difluoride (PVdF) or polytetrafluoro ethylene (PTFE). Additionally, the dispersant that may be used includes isopropyl alcohol, N-methylpyrrolidone, acetone, etc.

The current collector may be formed of a metal having high conductivity. There is no particular limitation in the collector as long as it is formed of a metal capable of being bonded with ease to the paste of electrode slurry. Non-limiting examples of a cathode current collector include foil formed of aluminum, nickel or a combination thereof. Non-limiting examples of an anode current collector include foil formed of copper, gold, nickel, copper alloys or a combination thereof.

The electrolyte that may be used in the present invention includes a salt represented by the formula of $A^+B^-$, wherein $A^+$ represents an alkali metal cation selected from the group consisting of $Li^+$, $Na^+$, $K^+$ and combinations thereof, and $B^-$ represents an anion selected from the group consisting of $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, $C(CF_2SO_2)_3^-$ and combinations thereof, the salt being dissolved or dissociated in an organic solvent selected from the group consisting of propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethylmethyl carbonate (EMC), gamma-butyrolactone (γ-butyrolactone) and mixtures thereof. However, the electrolyte that may be used in the present invention is not limited to the above examples.

The separator that may be used includes a porous separator that serves to interrupt internal short circuit between both electrodes and is impregnated with an electrolyte. Non-limiting examples of such porous separators include polypropylene-based, polyethylene-based and polyolefin-based porous separators.

The electrochemical device obtained by the method according to the present invention, preferably a lithium secondary battery may have a cylindrical, prismatic or pouch-like shape with no particular limitation.

BEST MODE FOR CARRYING OUT THE INVENTION

Reference will now be made in detail to the preferred embodiments of the present invention. It is to be understood that the following examples are illustrative only and the present invention is not limited thereto.

EXAMPLES 1-4

Carbonaceous Material Comprising Metal-/Metalloid-Carbide Coating Layer and Manufacture of Lithium Secondary Battery Using the Same

Example 1

1-1. Carbonaceous Material Having Cobalt Carbide Coating Layer (1)

Cobalt acetate $(Co(CH_3COO)_2.4H_2O)$ was dissolved in distilled water to provide aqueous cobalt acetate solution. The solution was added to artificial graphite A (artificial graphite series) as carbonaceous material, in the amount of 4 wt %, as expressed in the weight ratio (Co/C) of cobalt to carbonaceous material. Then, the resultant mixture was stirred and the solvent was evaporated. After removing the solvent completely, the resultant carbonaceous powder was dried in a vacuum oven for 12 hours. The dried powder was surface-treated in an electric furnace at 800° C. for 2 hours to obtain a carbonaceous material coated with cobalt carbide.

1-2. Manufacture of Lithium Secondary Battery

The carbonaceous material having a coating layer of cobalt carbide, obtained from Example 1-1, carbon as conductive agent and polyvinylidene difluoride (PVdF) as binder were mixed in the weight ratio of 95:1:4 to form slurry. The slurry was coated on a copper collector and then dried in a vacuum oven at 120° C. for 12 hours or more. Lithium metal was used as a counter-electrode. Additionally, 1M $LiPF_6$/ethylene carbonate (EC):ethylmethyl carbonate (EMC) (volume ratio=1:1) was used as electrolyte to provide a coin-type cell. The above-described procedure for assembling a cell was carried out in a glove box where both water content and oxygen concentration are maintained at 1 ppm or less.

Example 2

Example 1 was repeated to provide a carbonaceous material (2) having a cobalt carbide coating layer and a lithium secondary battery using the same as anode active material, except that artificial graphite B (artificial graphite series) was used instead of artificial graphite A as carbonaceous material.

Example 3

Example 1 was repeated to provide a carbonaceous material (3) having a cobalt carbide coating layer and a lithium secondary battery using the same as anode active material, except that natural graphite was used instead of artificial graphite A as carbonaceous material.

Example 4

Example 1 was repeated to provide a carbonaceous material (4) having a silicon carbide coating layer and a lithium secondary battery using the same as anode active material, except that artificial graphite B (artificial graphite series) was used instead of artificial graphite A as carbonaceous material, and that silicon acetate $(Si(CH_3COO)_4)$ was used instead of cobalt acetate while adjusting a weight ratio of Si/C to 0.5 wt % and setting a reaction temperature to 1400° C.

COMPARATIVE EXAMPLES 1-4

Comparative Examples 1-3

Manufacture of Lithium Secondary Battery

Example 1 was repeated to provide a lithium secondary battery, except that each of the carbonaceous materials used in Examples 1-3, i.e., artificial graphite A (Comparative Example 1), artificial graphite B (Comparative Example 2) and natural graphite (Comparative Example 3) was used in a non-treated state as anode active material.

Comparative Example 4

Carbonaceous Material Coated with Cobalt Oxide and Manufacture of Lithium Secondary Battery Using the Same Example 1 was repeated to provide a carbonaceous material having a cobalt oxide coating layer and a lithium secondary battery using the same as anode active material, except that artificial graphite B was used instead of artificial graphite A as carbonaceous material and that heat treatment of artificial graphite was not performed under inert atmosphere but in the air at 400° C.

Experimental Example 1

Analysis of Carbonaceous Materials Coated with Metal-/Metalloid-Carbides

The following experiment was performed to analyze carbonaceous materials coated with metal- and/or metalloid-carbides according to the present invention.

The sample used in this example was the carbonaceous material coated with cobalt carbide according to Example 1, and non-treated artificial graphite A was used as control.

1-1. Scanning Electron Microscope (SEM) Test

Figure 2:
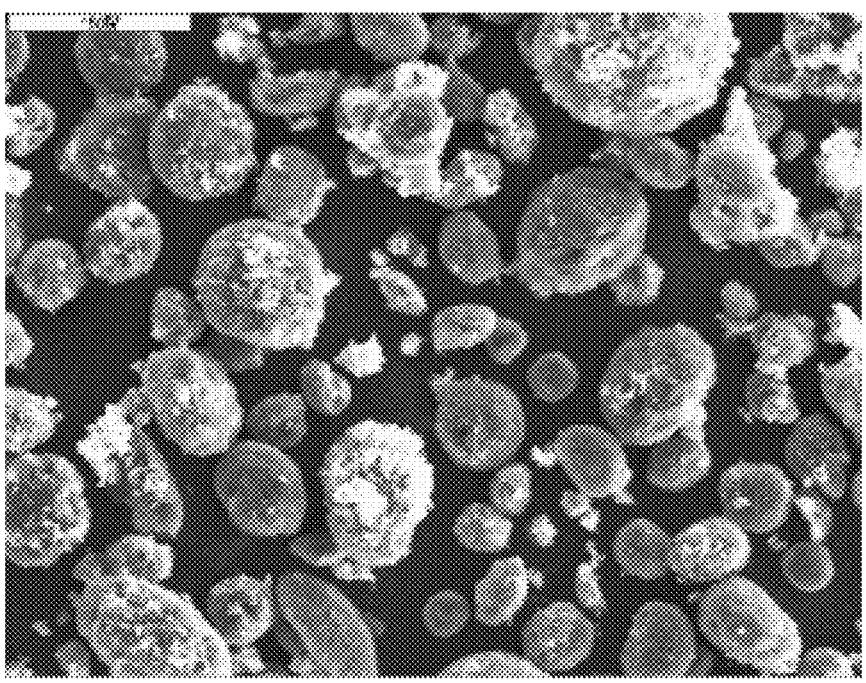
FIG. 2 is an SEM picture of the carbonaceous material having a coating layer of cobalt carbide according to Example 1.

The sample and control were observed by using a FE-SEM (Field Emission Scanning Electron Microscope) at a magnification of 500. After observation, the non-treated carbonaceous material as control showed a smooth surface (see, FIG. 1), while the carbonaceous material according to Example 1 showed a surface on which small particles are formed and distributed uniformly (see, FIG. 2)

1-2. Energy Dispersive X-ray Spectroscopy (EDX) Analysis

Figure 3:
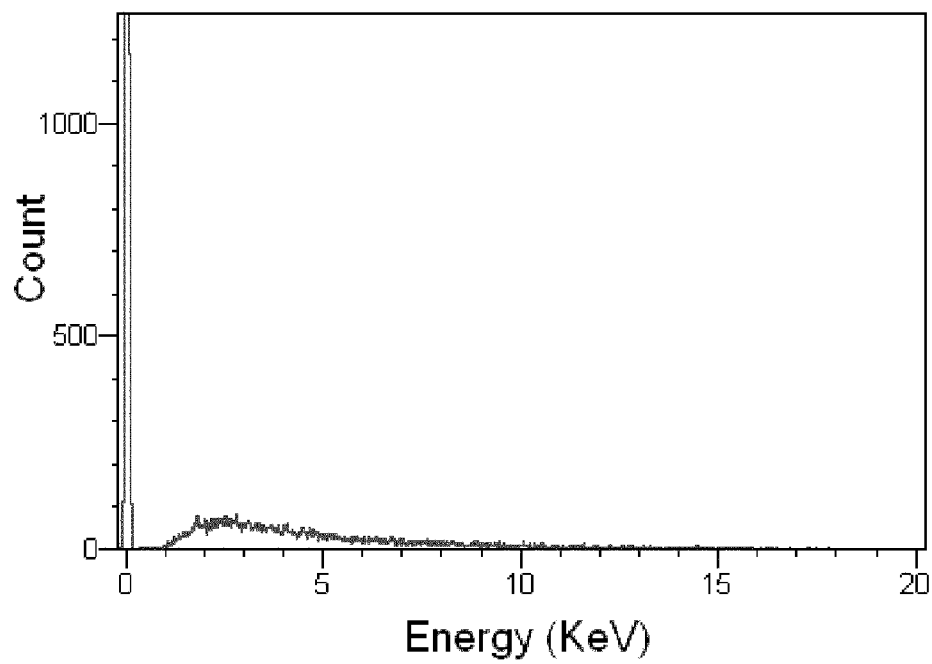
FIG. 3 is an EDX (Energy Dispersive X-ray Spectroscopy) diagram of a non-treated carbonaceous material.
Figure 4:
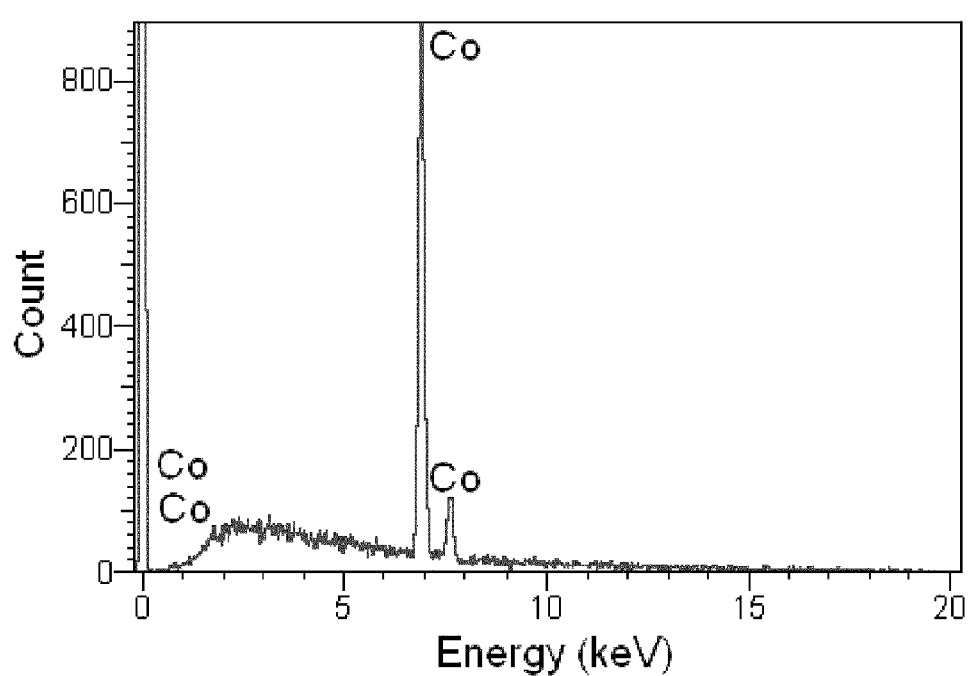
FIG. 4 is an EDX diagram of the carbonaceous material having a coating layer of cobalt carbide according to Example 1.

Each of the carbonaceous material according to Example 1 and the carbonaceous material as control was analyzed for surface elements by using an EDX analytic system. After analysis, any special elements other than carbon were not detected from the non-treated carbonaceous material (see, FIG. 3). On the contrary, a large amount of cobalt was detected from the carbonaceous material according to the inventive Example 1 (see, FIG. 4).

Therefore, it can be seen that the carbonaceous material according to the present invention is coated uniformly with a large amount of the corresponding metal-/metalloid-carbide on its surface.

Experimental Example 2

Evaluation for Quality of Lithium Secondary Battery

The following experiment was performed to evaluate the quality of a lithium secondary battery using, as anode active material, the carbonaceous material coated with a metal-/metalloid-carbide according to the present invention.

Each of the lithium secondary batteries according to Examples 1-3 using different carbonaceous materials coated with a metal-/metalloid-carbide coating layer was used as sample. As controls, used were the batteries according to Comparative Examples 1-3, each using non-treated artificial graphite A, artificial graphite B and natural graphite, and the battery using a carbonaceous material having a metal oxide coating layer formed under low temperature/oxygen-containing atmosphere according to Comparative Example 4.

Each battery was subjected to charge/discharge cycles in the charge/discharge range of between 2.0 and 0.005 V (vs. Li/Li$^+$) at a current density of 0.1C. The results of the initial charge/discharge efficiency for each battery are shown in the following Table 1. In Table 1, the initial charge/discharge efficiency (%) is a percentage of the first discharge capacity divided by the first charge capacity.

Figure 5:
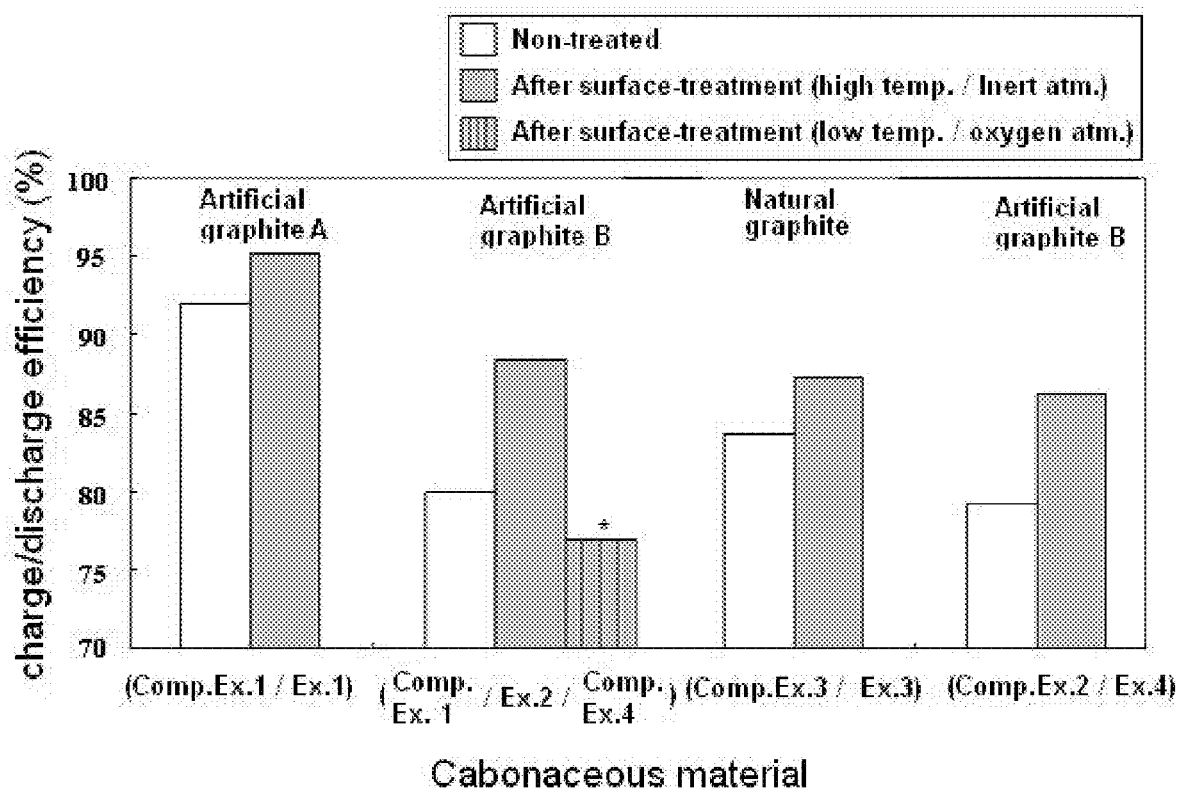
FIG. 5 is a graph showing initial charge/discharge capacity of each of the lithium secondary batteries according to Comparative Examples 1-4 and Examples 1-4, which use, as anode active materials, non-treated carbonaceous materials (artificial graphite A, artificial graphite B and natural graphite) and the same carbonaceous materials coated with cobalt carbide, respectively.

After observing the initial charge/discharge efficiency, it could be seen that lithium secondary batteries using carbonaceous materials having a cobalt carbide coating layer according to Examples 1-3 showed an increase of charge/discharge efficiency by about 3-9% compared to the batteries using the same non-treated carbonaceous materials as anode active materials according to Comparative Examples 1-3 (see, FIG. 5 and Table 1). Particularly, the battery using artificial graphite B coated with a coating layer of cobalt carbide according to Example 2 showed a significant increase in charge/discharge efficiency by 8.4% compared to the battery using the same carbonaceous material according to Comparative Example 2 (see, Table 1).

It is to be noted that the battery using a carbonaceous material coated with a coating layer of cobalt oxide obtained by coating a carbonaceous material with a cobalt compound and then heat treating the resultant material in the air at 400° C., in the same manner as known methods, according to Comparative Example 4, shows a decrease in charge/discharge efficiency by 3.6% compared to the battery according to Comparative Example 2 using the same non-treated carbonaceous material (see, FIG. 5 and Table 1). This indicates that conventional surface treating methods (carried out under low temperature/oxygen-containing atmosphere) and a coating layer of metal-/metalloid-oxide obtained thereby are not suitable for reinforcing qualities of an anode.

Therefore, it can be seen that the carbonaceous material having a coating layer of metal-/metalloid-carbide according to the present invention can decrease the initial irreversible capacity of an anode and thus can significantly increase the charge/discharge efficiency of a battery, when used as anode active material in a lithium secondary battery. Additionally, the surface modification method carried out under high temperature/inert atmosphere according to the present invention results in excellent reinforcement of qualities of an anode.

TABLE 1

| Sample | Carbonaceous Material | Surface Treatment Material | Surface Treatment Temperature (° C.) | Initial Charge/Discharge Efficiency (%) |
|---|---|---|---|---|
| Ex. 1 | Artificial Graphite A | Cobalt Carbide | 800 | 95.20 |
| Comp. Ex. 1 | | — | — | 92.00 |
| Ex. 2 | Artificial Graphite B | Cobalt Carbide | 800 | 88.40 |
| Comp. Ex. 2 | | — | — | 80.00 |
| Comp. Ex. 4 | | Cobalt Oxide | 400 | 76.40 |
| Ex. 3 | Natural Graphite | Cobalt Carbide | 800 | 87.30 |
| Comp. Ex. 3 | | — | — | 83.60 |
| Ex. 4 | Artificial Graphite B | Silicon Carbide | 1400 | 86.90 |
| Comp. Ex. 2 | | — | — | 80.00 |

INDUSTRIAL APPLICABILITY

As can be seen from the foregoing, the carbonaceous material according to the present invention has a coating layer of metal- and/or metalloid-carbide formed on the surface thereof, the metal- and/or metalloid-carbide being electrochemically inactive to lithium. When the carbonaceous material is used as anode active material of a lithium secondary battery, the lithium secondary battery can realize an increase in the initial charge/discharge efficiency and can provide reinforced qualities of an anode.

While this invention has been described in connection with what is presently considered to be the most practical and preferred embodiment, it is to be understood that the invention is not limited to the disclosed embodiment and the drawings. On the contrary, it is intended to cover various modifications and variations within the spirit and scope of the appended claims.

The invention claimed is:

1. A method for manufacturing a carbonaceous material having a coating layer of a metal-carbide, a metalloid-carbide or a metal-metalloid-carbide, which comprises the steps of:
   (a) coating a surface of carbonaceous material with a compound containing at least one element selected from the group consisting of metals and metalloids; and
   (b) heat-treating the carbonaceous material coated in step (a) under inert atmosphere at a temperature equal to or higher than a temperature where the metal-carbide, the metalloid-carbide or the metal-metalloid-carbide is formed,
   wherein the coating layer of the metal-carbide, the metalloid-carbide or the metal-metalloid-carbide is represented by the following Formula 1:

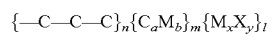

[Formula 1]

wherein M is at least one metal or metalloid element selected from the group consisting of alkali metals, alkaline earth metals, transition metals and elements of Group 13 and Group 14;

X is an oxygen atom or a nitrogen atom;

each of n, m, x, a and b independently represent a natural number of 1 or more; and each of l and y independently represent an integer of 0 or more.

2. The method according to claim 1, wherein step (a) includes the steps of:

(i) dispersing or dissolving a metal compound comprising at least one element selected from the group consisting of cobalt (Co), manganese (Mn), nickel (Ni), iron (Fe), aluminum (Al), magnesium (Mg), boron (B), titanium (Ti), zirconium (Zr), zinc (Zn) and silicon (Si) and/or a metalloid compound comprising at least one element selected from the group consisting of cobalt (Co), manganese (Mn), nickel (Ni), iron (Fe), aluminum (Al), magnesium (Mg), boron (B), titanium (Ti), zirconium (Zr), zinc (Zn) and silicon (Si) into a solvent to provide a dispersion or solution containing the same compound; and (ii) adding the dispersion or solution obtained from step (i) to the carbonaceous material, followed by stirring and drying.

3. The method according to claim 1, wherein the solution or dispersion obtained from step (i) is added to the carbonaceous material in such an amount that the weight ratio of metal (M) or metalloid (S) to carbonaceous material (C) (M/C or S/C) ranges from 0.5 wt % to 20 wt %.

4. The method according to claim 1, wherein the carbonaceous material is at least one selected from the group consisting of natural graphite, artificial graphite, fiber graphite, amorphous carbon and amorphous carbon-coated graphite.

5. The method according to claim 1, wherein the heat treatment temperature ranges from 500° C. to 2000° C.

6. The method according to claim 1, wherein the heat treatment is conducted in an inert atmosphere.

7. The method according to claim 6, wherein the inert atmosphere includes at least one inert gas selected from the group consisting of nitrogen, argon, xenon and helium.

8. An anode active material comprising the carbonaceous material having a coating layer of a metal-carbide, a metalloid carbide or a metal-metalloid-carbide produced according to the method of claim 1.

9. An electrochemical device comprising the anode active material according to claim 8.

10. An electrochemical device comprising an anode active material comprising the carbonaceous material having a coating layer of a metal-carbide, a metalloid carbide or a metal-metalloid-carbide produced according to the method of claim 1.

* * * * *